Aug. 31, 1943.　　　　L. G. STANLEY　　　　2,328,400
BILLFOLD OR POCKET CASE
Filed Feb. 5, 1941　　　　3 Sheets-Sheet 1
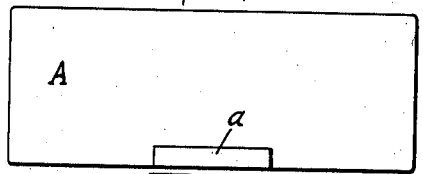
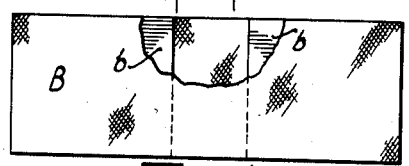
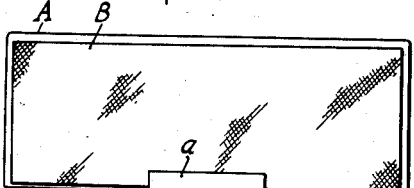
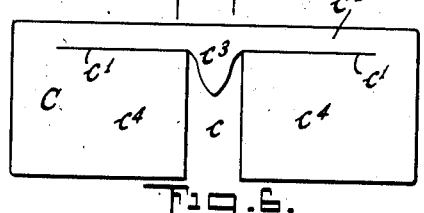
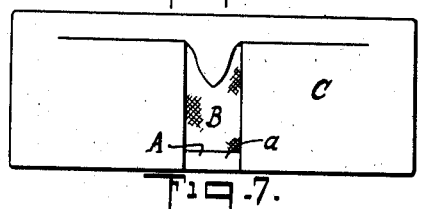
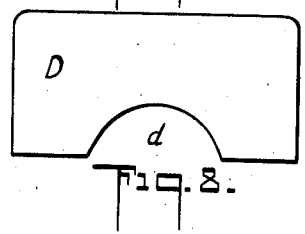
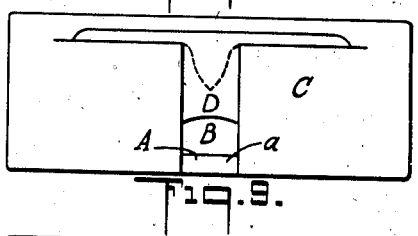
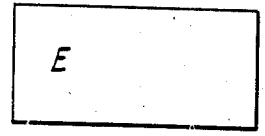
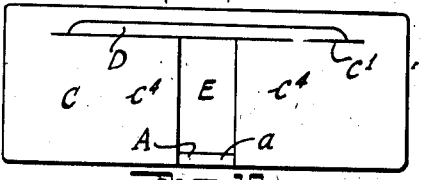
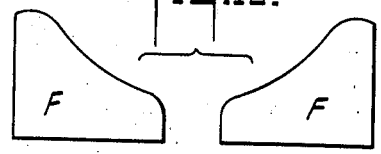
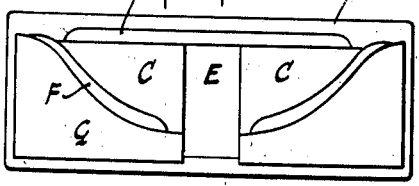
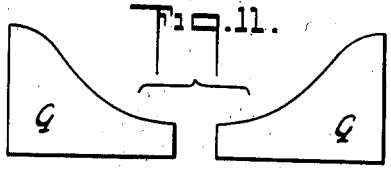
INVENTOR:
L. G. Stanley
BY
Morrison, Kennedy & Campbell
ATTORNEYS.

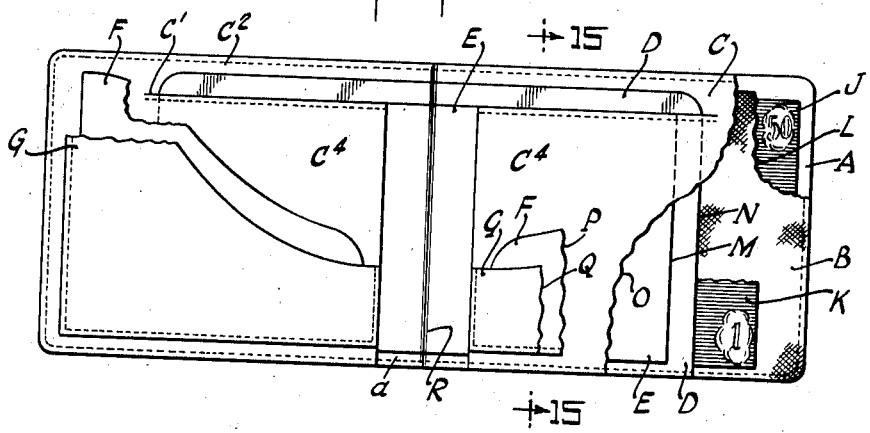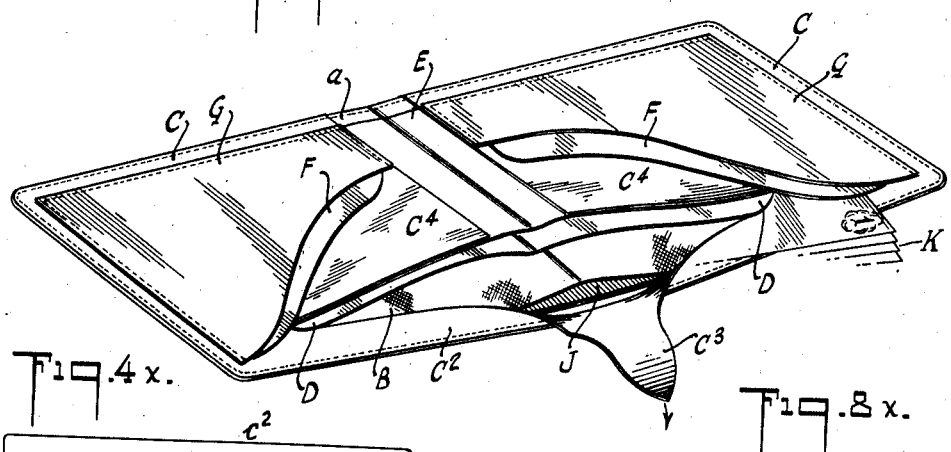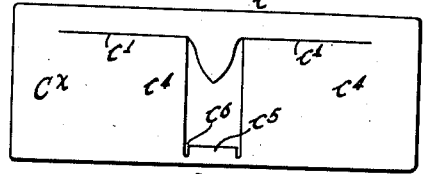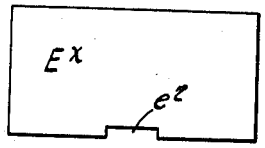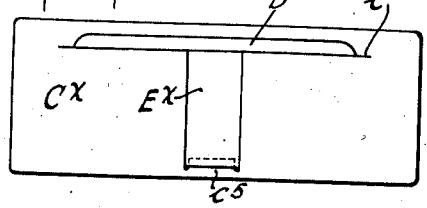

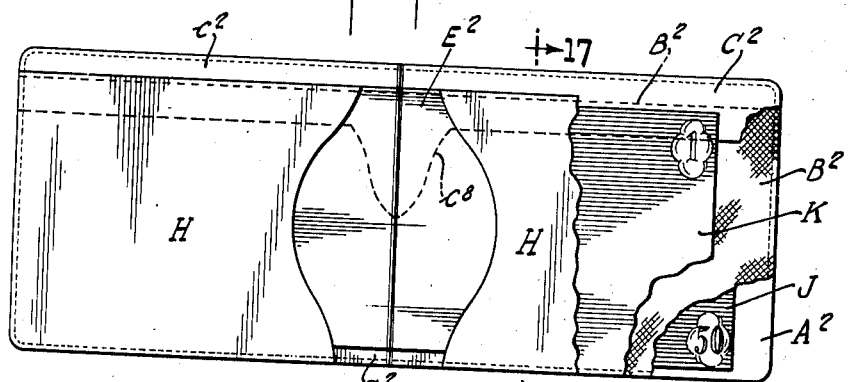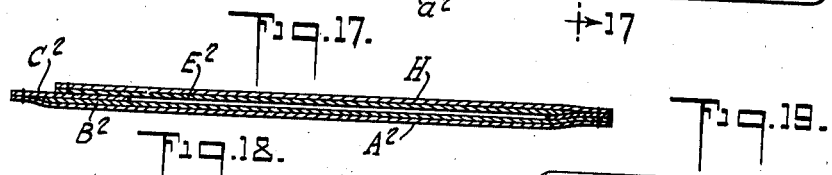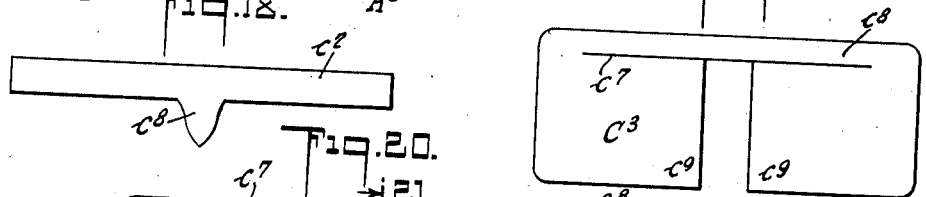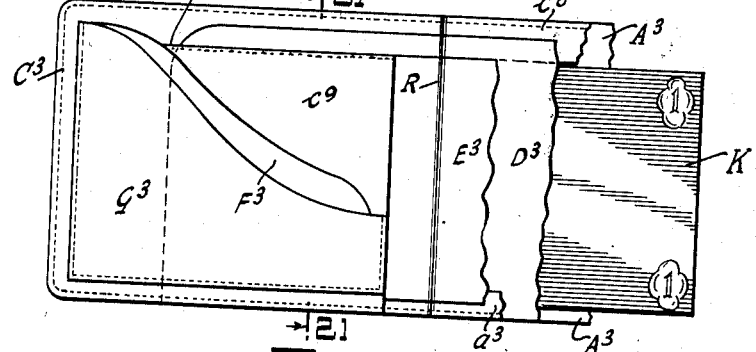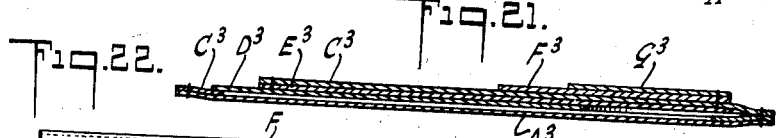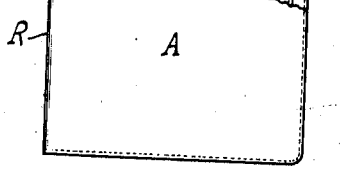

Patented Aug. 31, 1943

2,328,400

UNITED STATES PATENT OFFICE 2,328,400

BILLFOLD OR POCKET CASE

Leopold G. Stanley, Maplewood, N. J.

Application February 5, 1941, Serial No. 377,425

8 Claims. (Cl. 150—36)

This invention is a novel billfold, or pocket case of the class which has a pocket or pockets to carry paper money or the like, is composed of leather or analogous limp material, and preferably closes by folding or doubling endwise into a compact case readily openable for access to the money bills, and usually with accessory pockets for carrying other small flat articles, tickets and the like.

The general object of the present invention is to afford a billfold that is composed of a number of components of leather or the like built up or assembled in a novel way and affording an improved structure, which is stronger and more durable than the conventional billfold. A particular object is to improve the structure at the corners, which constitute a substantial problem in billfold manufacture.

A further object of the invention is to provide in a practical way a secret pocket in the billfold, in addition to the regular pocket or pockets, and opening at the same side therewith, the secret pocket for example, being serviceable for the holding and concealment of bills of large denomination, which thus will afford a certain safety, and can not be accidentally extracted when intending to extract bills of small denomination. Another object is to combine the structural and secret pocket features cooperatively in the same case or billfold. Further advantages of the billfold hereof will appear in the hereinafter following description of several illustrative embodiments thereof.

In the accompanying drawings Figs. 1 to 11 show the structural layers or successive components A to G of a complete embodiment of the invention, the components being shown both separately and in various stages of assembly. Thus Fig. 1 is a face view of the bottom or outer layer or component of a first illustrative embodiment; and Fig. 2 and the succeeding Figs. 3 to 11, inclusive, showing the other components respectively; and the progressive combining of the components in their assembling into the complete billfold, which is shown in interior face view in Fig. 12.

Fig. 13 on a larger scale than Fig. 12 shows the completed billfold constructed in accordance with Figs. 1 to 12, with various of the components broken away to illustrate more clearly the interior structure and relation of the parts. Fig. 14 is a perspective view of the same billfold, but showing it with the parts manipulated to expose the secret pocket and the bills contained therein. Fig. 15 is a transverse section view taken on the line 15—15 of Fig. 13.

Fig. $4^\times$ is a face view of a modification of the component C shown in Fig. 4 while Fig. $8^\times$ shows a modification of the component E of Fig. 8, and Fig. $9^\times$ shows the assemblage or combination of these two modified components with the components A, B and D.

Figs. 16, 17 and 18 are views corresponding generally with Figs. 13, 15 and 4 respectively, showing a modified form of billfold, with the secret pocket feature; Fig. 17 being a section view taken on the line 17—17 of Fig. 16.

Similarly Figs. 19, 20 and 21 are views corresponding generally with Figs. 4, 13 and 15 respectively, showing another modified form of billfold, with the construction method feature; Fig. 21 being a sectional view taken on the line 21—21 of Fig. 20.

Fig. 22 is a face view of the billfold of any of the illustrated forms, but in closed condition, and partly broken away to show a small portion of the interior.

The respective components are designed by the letters A to G, and except for Fig. 22 they are shown in flat open condition, it being assumed that the billfold and components are lying on a table in open condition, with the exterior side of each layer downward and with the interior in full view, so that the outside or first layer or component A of the billfold whether closed or open may be described as the bottom layer or component, and the other components correspondingly, the top or last layer being G, which is in two separate but symmetrical pieces.

Referring first to Figs. 1 to 15 the complete embodiment may best be explained by first describing the successive layers, their relation and the progressive assembling thereof. The back or outer first component or layer A is shown in Fig. 1 as a simple oblong composed preferably of leather and of a size sufficiently larger than a money bill that the pockets to be formed will accommodate the latter. The component A is shown as having attached to one side edge a short strip $a$ to bridge across the gap in layer C as will be described, although this bridge is dispensed with if the modification of Fig. $4^\times$, $8^\times$ and $9^\times$ be followed.

The layer B is shown in Fig. 2, this being a necessary element for the secret pocket, formed by the space between layers A and B. Layer B is slightly smaller than layer A in both directions and may be composed of a doubled piece of silk material with interposed stiffeners $b$—$b$ extending from its ends nearly to the middle. The layer B may be laid upon the layer A, as shown in Fig.

3, with the strip $a$ on top, and secured temporarily until later permanently secured by a seam or seams.

The third layer C is shown separately in Fig. 4, and in Fig. 5 assembled upon the combined layers A and B. Layer C is oblong and may be of the full dimensions of layer A. It is cut out with a central aperture or recess $c$ extending from its near or bottom edge across to meet a pair of slits $c'$ which are arranged in alinement, not reaching either to the ends or to the center. The slits $c'$ therefore set off an edge strip $c^2$ across the top side of the layer, this strip being of importance since it is relied upon to conceal the entrance to the secret pocket between layers A and B. To facilitate opening the secret pocket the strip $c^2$ has a central depending tab $c^3$ reaching into the central recess $c$. By the recess and the slits therefore the layer C is divided into the band $c^2$, tab $c^3$ and a symmetrical pair of end flaps $c^4$. When layer C is assembled upon layers A and B the temporary result is as seen in Fig. 5. At this stage a seam may be run around all four edges of the temporary assembly thus consolidating layers A and C, and preferably also anchoring layer B, at least along its lower edge.

The next or fourth layer D, shown in Fig. 6, is slightly shorter than the combined length of the slits $c'$ and is of width slightly greater than layer B but smaller than layers A and C; and it is preferably formed with a central cutaway area $d$ of substantial size at its lower edge. In assembling component D with components A, B and C, as seen in Fig. 7, component D is placed to extend through the slits $c'$, with its lower part behind the symmetrical flaps $c^4$ and its upper edge partly overlying the strip $c^2$. Layer D therefore lies partly below and partly above layer C.

Layer E is shown in Fig. 8 and it may be a simple oblong piece of leather, preferably somewhat shorter than layer D, as well as somewhat narrower. This fifth layer is assembled upon layer D, beneath the symmetrical flaps $c^4$, but with its upper edge in alinement with the upper edges of said flaps, as shown in Fig. 9. The lower edge of layer E may overlap the short strip $a$, so that layer D is now entirely concealed except for its narrow upper margin which overlies layer C beyond the slits $c'$. Layer E is to be stitched to the upper edges of the two flaps $c^4$, thus becoming in effect a part of layer C. The flaps are left unsewed at their upright edges so that they form symmetrical pockets opening centrally of the billfold, while a long bill pocket is provided behind the layer E, between it and the layer B, the layer D serving as a separator, splitting the long pocket into two pockets.

The next or sixth layer consists of a symmetrical pair of leather pieces F—F, which may be stitched upon the respective flaps $c^4$—$c^4$, to form supplemental or overlying pockets, convenient for various small articles. Instead of each portion F being of oblong form it is preferably truncated at its upper inner portion, with a sweeping curved line, as shown, such as to overlie and conceal the ends of the slits of layer C. As a final layer a second such pair of supplemental portions G—G may be applied on top of portions F—F, but with a more abridged outline, so that the portions F—F will remain in sight and there will be at each side of the billfold a supplemental pocket both below layer F and between layers F and G. These later components may next be stitched together, or it may be more convenient to stitch layers F and G on top of layer C, at each side, before layer C is combined with and stitched to layer A.

The entirety thus described, built from the seven successive components A to G, is shown in small scale in Fig. 12, where some part of every component appears with the exception of layer B. The same article is shown on a larger scale in Fig. 13, broken away to illustrate the various pockets that are formed, while Fig. 14 shows the open billfold in perspective, manipulated to expose the secret pocket and its contents; Fig. 15 being an explanatory cross section view on the line 15—15 of Fig. 13, while Fig. 22 indicates the character of the billfold when closed.

Figs. 13 and 14 show how bills J of large denomination and bills K of small denomination may be accommodated in certain pockets, with three additional pockets at each inner side of the case. Thus the large bills are shown accommodated in the secret pocket L, which lies behind the layer B, between it and layer A, the entrance being totally concealed by the strip $c^2$, but being readily accessible by pulling out on the tab $c^3$ as shown in Fig. 14. Next, the main bill pocket is divided by the layer D into an outer pocket section M and an inner section N, lying behind the layers or walls D and E respectively. The opposite interior flap pockets O lie behind the respective flaps $c^4$, each pocket opening inwardly toward the axis or fold of the case. Superposed thereon are the supplemental pockets P behind the layers F and pockets Q behind the layers G. Thereby nine distinct pockets are afforded by seven layers of material.

The modification indicated in Figs. $4^\times$, $8^\times$ and $9^\times$ is in respect to the layers C and E, these figures showing the modified forms as contrasted with the disclosures in Figs. 4, 8 and 9. The third layer $C^\times$ is similar to layer C, excepting that across the lower edge is left a narrow strip or bridge $c^5$ connecting the flaps $c^4$ at this point, thus preserving the oblong outline of the entire piece and facilitating handling. The bridge $c^5$ extends upwardly a substantial distance, but its upper part is separated from the side flaps by slits $c^6$ to accommodate the layer $E^\times$ which is shown separately in Fig. $8^\times$. The layer $E^\times$ has a cutaway notch $e^2$ to accommodate the bridge strip $c^5$. The elements $C^\times$ and $E^\times$ are shown assembled with elements A and D in Fig. $9^\times$, where the bridge piece $c^5$ is seen to cover the space which otherwise would be covered by the strip $a$, which latter may then be omitted from layer A of Fig. 1.

The modification shown in Figs. 16 to 18 embodies the secret pocket feature of the previous figures, but in modified form and without the special third layer or component C as shown in Figs. 4 and $4^\times$. The modification is built up of a smaller number of pieces, commencing with an outer layer $A^2$, upon which is assembled and stitched a slightly narrower layer $B^2$. The layer $A^2$ has a central edge strip $a^2$ corresponding to the strip $a$ of Fig. 1. The secret pocket is accommodated between the layers or walls $A^2$ and $B^2$, as shown by the presence of the bills J therein in Fig. 16. Access to this pocket is obtainable along the top edge of the layer $B^2$, but the entrance is wholly concealed by a third layer $C^2$ which in this form is a mere narrow strip, shown separately in Fig. 18, stitched to the outer layer $A^2$ and wide enough to overlie the edge of the layer $B^2$. The layer or strip $C^2$ has an extension or tab $c^3$ by which the strip may be swung out to give access to the pocket, similarly to the operation indicated in Fig. 14. The main bill pocket is formed between the layer B² and a superposed layer E² which in this embodiment is of the full length of the case and is stitched around the ends and the bottom edge. If desired a separator could be introduced between layers B² and E², of the character of the separator D in the embodiment first described. In order to provide interior pockets there are next shown an opposite pair of walls H, each stitched around three sides to the layer E², but leaving a curved open edge by which access may be had when the case is opened flatly as seen in Fig. 16, these pockets preferably opening toward the central hinge of the case.

In Figs. 19 to 21 the billfold has some of the structural characteristics of Figs. 1 to 15 and Figs. 16 to 18, but without the secret pocket, the second layer or wall B being omitted and the billfold being thinner and less expensive to manufacture. The outer layer or wall A³ may have an exposed bottom edge finishing strip a³ as in Figs. 1 and 16. Upon layer A³ is layer C³, slitted at c¹ to form the top edge strip c⁸ covering the otherwise exposed top margin of the first layer A³; while a central gap divides the body of layer C³ into flaps c⁹—c⁹, as shown in Fig. 19, to form symmetrical pockets. Extending through the slits is a short layer or wall D³, its upper edge overlapping the top strip c⁸ and concealing its lower edge. This layer or partition D³ separates the main pocket into two pockets both opening upwardly. Upon the divider wall or layer D³ is an interposed layer E³ attached beneath the side flaps c⁹ which lie upon it and form interior pockets opening toward the centerline or hinge R of the case. Upon each of the flaps are small supplemental pocket walls F³ and G³ similar to the final layers shown in Figs. 10 to 14. Thus in the form of Figs. 19 to 21 are provided a subdivided bill pocket and three pairs of interior pockets.

Fig. 22 on a small scale shows any one of the described billfolds in its closed position, with the hinge R at the left, and a corner of the first or outer layer or wall A being broken away at the right to show parts of the interior layers D, F and G.

It will be noticed that in all embodiments the corners are well constructed, simple and yet strong; this being due in part to the provision of the wall C, C×, C², or C³, and especially the upper edge band or marginal strip thereof c² or c⁸, which, in each embodiment, is visible when the billfold is flatly opened, and stands upwardly beyond all of the other layers and walls with the exception of the first or outer wall A. The upper corner stitching extends around the rounded corners to connect such marginal band or strip with the outer wall A, the remaining walls being independently connected at points lower down. The extreme corners therefore are wholly unbroken by any extensions or tabs from other walls reaching to such corners, as has been heretofore practiced. At the corner of the disclosed billfold the stitching which connects the outer layer or wall to the layer which comprises the marginal band is an uninterrupted stitching extending along one side edge, thence around the corner and along the contiguous end edge.

In respect to the secret pocket feature the invention may be reviewed as comprising the full-size oblong outer or first layer, as A, substantially longer and wider than the money or bills to be accommodated, with a second oblong layer, as B, positioned upon but narrower than the first layer and therewith forming the secret pocket which is openable at the long upper edge of the billfold, and the marginal band which has its upper edge attached or sewed along the upper edge of the first layer and being of width to extend across the free upper edge of the second layer to conceal the same and protect the secret pocket; with a superposed further layer or wall forming with the other layers a main bill pocket also open at the long upper edge of the billfold, so that by opening the main pocket and bending away the protecting marginal band, as by the tab c³, the secret pocket is accessible. As embodied in Figs. 16 to 18 the superposed layer E² is of the full length of the billfold, and is a separate piece from the marginal band; and of a width to overlap and conceal the lower edge of the band. In Figs. 1 to 15 however the marginal band c² is in one piece with an oblong body c⁴, c⁴, the two separated by the slit c³ which is of short length, while specifically the body is separated by a gap into two flaps c⁴, c⁴ which, with an underlying layer E form a pair of inside pockets facing each other; and in this form it is preferable to employ the divider wall D which not merely partitions the main pocket into two pockets, but by extending through the slit c' overlies and conceals the lower edge of the marginal band portion c² of the layer C.

In certain aspects there are features of novelty herein disclosed, the utility of which is not necessarily limited to a billfold or pocket case that doubles endwise, and might be applied to a pocket bill case to receive bills which always remain flat, without folding. In such a pocket bill case may be embodied the principle of combining the long and wide outer layer A with the superimposed layer C that is slitted lengthwise to set off the marginal band c² which lines the inner upper margin of the outer layer while leaving the body of the layer C with its upper edge short of the upper edge of the outer layer, and the slit extending nearly to the extreme ends so that a main bill pocket is formed between the outer and superimposed layers which is accessible by merely deflecting the upper free edge of the body. This conception is convertible into a case with secret pocket by the providing of the intermediate layer B between the other two layers but with its upper edge beneath and covered by the marginal band, so that by pulling away the marginal band access is given to the secret pocket. Also, this structure forms the basis of the structure shown in Fig. 20 wherein another layer or divider wall D is arranged to project through the slit and cover the lower edge of the marginal band, thus to divide the main pocket into two pockets.

There have thus been described representative embodiments of the present invention, and the several features thereof; but since many matters of combination, construction, arrangement and design may be variously modified without departing from the novel principles, it is not intended to limit the invention to such matters except to the extent set forth in the appended claims.

What is claimed is:

1. A billfold of leather or like material of the kind having an elongated oblong shape when opened flat but being foldable about a hinge to close it and being built up of component layers or walls, including a full-size oblong outer or first layer substantially longer and wider than the money or bills to be accommodated, a second oblong layer positioned upon but narrower than the first layer and forming therewith a secret pocket openable at the long upper edge of the billfold, a third layer comprising an upper marginal band and a symmetrical pair of flaps separated from the band by a longitudinal slit and from each other by a middle gap, said band having its upper edge attached along the upper edge of the first layer and being of width to extend downwardly over the free upper edge of the second layer to conceal the same and protect the secret pocket, an interposed layer arranged beneath the opposite flaps of said third layer and upon which said two flaps are attached to form symmetrical inside pockets, and said flaps and attached interposed layer together forming with said second layer a main bill pocket open at the long upper edge of the billfold.

2. A billfold of leather or like material of the kind having an elongated oblong shape when opened flat but being foldable about a hinge to close it and being built up of component layers or walls, including a full-size oblong outer or first layer substantially longer and wider than the money or bills to be accommodated, a second oblong layer positioned upon but narrower than the first layer and forming therewith a secret pocket openable at the long upper edge of the billfold, a third layer comprising a body, an upper marginal band formed by a slit between body and band and a symmetrical pair of flaps formed by a middle gap in the body, said band having its upper edge attached along the upper edge of the first layer and being of width to extend downwardly over the free upper edge of the second layer to conceal the same and protect the secret pocket, an interposed layer arranged beneath the body of said third layer and upon which said two flaps are attached to form symmetrical inside pockets, and said body flaps and interposed layer forming with said second layer a main bill pocket open at the long upper edge of the billfold.

3. A billfold of leather or like material of the kind having an elongated oblong shape when opened flat but being foldable endwise about a hinge to close it and being built up of component layers or walls, including a full-size oblong outer or first layer substantially longer and wider than the money or bills to be accommodated; a second oblong layer positioned upon but narrower than the first layer and stitched thereto at its ends with its upper edge free and forming therewith a full length secret pocket with its entrance at the long upper edge of the billfold; a third layer comprising an oblong body and an integral upper marginal band formed by a slit between body and band, said third layer and its marginal band being of the full length of the billfold and said band having its upper edge attached along the upper edge of the first layer and being of width to extend downwardly over the free upper edge of the second layer to conceal wholly the same and protect the secret pocket, and said body portion of the third layer forming with said second layer an exposed main bill pocket open at the long upper edge of the billfold; and a short-length inserted wall secured at its lower part between said second layer and said body portion, with its upper part free and extending upwardly behind said body portion and through such slit to overlap the lower edge of such marginal band.

4. A billfold of leather or like material of the kind having an elongated oblong shape when opened flat but being foldable about a hinge to close it and being built up of component layers or walls, including a full-size oblong outer or first layer substantially longer and wider than the money or bills to be accommodated, a second oblong layer positioned upon but narrower than the first layer and forming therewith a secret pocket openable at the long upper edge of the billfold, a third layer comprising an oblong body and an upper marginal band formed by a slit between body and band, said band having its upper edge attached along the upper edge of the first layer and being of width to extend downwardly over the free upper edge of the second layer to conceal the same and protect the secret pocket, and said body forming with said other layers a main bill pocket open at the long upper edge of the billfold; whereby on opening the main pocket and bending away the protecting marginal band the secret pocket is accessible; and a divider wall arranged loosely in the main bill pocket, located beneath the body of the third layer but extending through the slit thereof and of width to overlap and conceal the lower edge of the band thereof.

5. A billfold of leather or like material of the kind having an elongated oblong shape when opened flat but being foldable about a hinge to close it and being built up of component layers or walls, including a full-size oblong outer layer substantially longer and wider than the money or bills to be accommodated; a superimposed layer slitted lengthwise near its upper edge forming a wall body and a marginal band joined at its ends to its body, said marginal band having its upper edge attached along the upper inner edge of the outer layer, said superimposed wall body forming between it and said outer layer a bill pocket open at the long upper edge of the billfold, and said wall body being separated into two pocket forming flaps by a central gap of substantially the full width of the body, and a longitudinal connecting wall beneath and bridging such two flaps and stitched thereto along their upper edges but unstitched at their transverse edges nearest to said hinge, thereby to form therewith two exposed pockets open toward said hinge.

6. A billfold of leather or like material of the kind having an elongated oblong shape when opened flat but being foldable about a hinge to close it and being built up of component layers or walls, including a full-size oblong outer layer substantially longer and wider than the money or bills to be accommodated, a superimposed layer slitted lengthwise near its upper edge forming a wall body and a marginal band joined at its ends to its body, said marginal band having its upper edge attached along the upper inner edge of the outer layer, said superimposed wall body forming between it and said outer layer a bill pocket open at the long upper edge of the billfold, and said wall body being separated into two pocket forming flaps by a central recess, and a longitudinal connecting wall beneath and bridging the two flaps, and a divider wall dividing the bill pocket into two compartments, said divider wall being arranged beneath the said two separate flaps and their connecting wall and projecting upwardly through such slit to overlap said marginal band; and said two flaps and connecting wall mutually forming exposed inner pockets.

7. A pocket billfold of leather or the like having an elongated oblong shape and being built up of component layers, including an oblong outer layer of dimensions both longer and wider than the money bills to be accommodated, with middle hinge about which the billfold is closable, a superimposed oblong layer of similar dimensions to and stitched around the sides and ends of the outer layer and slitted lengthwise near to its upper edge thereby to set off a marginal band visibly lining the inner upper margin of the outer layer while leaving the body of the superimposed layer with its upper edge somewhat short of the upper edge of the outer layer, the body of the superimposed layer having its upper edge free or open for access to the bill pocket formed between it and the outer layer, and said body being centrally divided to form two symmetrically opposite flaps, with a separate bridge piece attached across underneath the two flaps to form center-facing inner pockets and to close the bill pocket but of such dimension that the said body is somewhat shorter than the band and is thereby smoothly accommodated within the outer layer when closed.

8. A billfold of leather or like material of the kind having an elongated oblong shape when opened flat but being foldable about a hinge to close it and being built up of component layers or walls, including a full-size oblong outer layer substantially longer and wider than the money or bills to be accommodated, a superimposed layer slitted lengthwise near its upper edge forming a marginal band joined at its ends to its body, said marginal band having its upper edge attached along the upper inner edge of the outer layer, said body being centrally recessed to form a gap separating it into two opposite flaps, a bridging wall attached beneath said two flaps, therewith to form a pair of inner pockets, said bridging wall and flaps together affording a bill pocket opening upwardly between the same and the outer wall; the marginal band being exposed for a substantial width from extreme upper corner to corner of the billfold and connected to the outer layer by a seam which extends from the upper side around the corners into the ends.

LEOPOLD G. STANLEY.